United States Patent
Hang (10) Patent No.: US 9,571,622 B2
(45) Date of Patent: Feb. 14, 2017

(54) METHOD OF INPUTTING DATA ENTRIES OF A SERVICE IN ONE CONTINUOUS STROKE

(75) Inventor: Lin Tsung Hang, New Taipei (TW)

(73) Assignee: KIKA TECH (HK) HOLDINGS CO. LIMITED, Kowloon (HK)

( * ) Notice: Subject to any disclaimer, the term of this patent is extended or adjusted under 35 U.S.C. 154(b) by 107 days.

(21) Appl. No.: 13/304,700

(22) Filed: Nov. 28, 2011

(65) Prior Publication Data

US 2013/0139092 A1    May 30, 2013

(51) Int. Cl.
  *G06F 3/048* (2013.01)
  *H04M 1/725* (2006.01)
  *G06F 3/0488* (2013.01)

(52) U.S. Cl.
  CPC ........ *H04M 1/72519* (2013.01); *G06F 3/0488* (2013.01); *H04M 1/72566* (2013.01); *H04M 1/72583* (2013.01); *H04M 2250/22* (2013.01)

(58) Field of Classification Search
  CPC   G06F 19/3406; G06F 3/04883; G06F 19/321; G06F 9/30; G06F 9/542; G06F 3/0481; G06F 3/0482; G06F 3/0488; G06F 3/04886; G06F 3/04895
  See application file for complete search history.

(56) References Cited

U.S. PATENT DOCUMENTS

| | | | |
|---|---|---|---|
| 2005/0066291 A1* | 3/2005 | Lewak | G06F 1/1626 715/810 |
| 2005/0283804 A1* | 12/2005 | Sakata | H04N 5/44543 725/52 |
| 2007/0152981 A1* | 7/2007 | Im et al. | 345/173 |
| 2008/0141145 A1* | 6/2008 | Klausmeier | G06Q 10/109 715/751 |
| 2008/0270896 A1* | 10/2008 | Kristensson | G06F 3/0237 715/261 |
| 2009/0228832 A1* | 9/2009 | Cheng | G06F 3/0482 715/810 |
| 2011/0057885 A1* | 3/2011 | Lehtovirta | G06F 3/0482 345/173 |
| 2011/0066978 A1* | 3/2011 | Sung | G06F 3/0488 715/823 |
| 2011/0078622 A1* | 3/2011 | Missig | G06F 3/0486 715/784 |
| 2011/0134068 A1* | 6/2011 | Shimoni | G06F 3/04883 345/173 |
| 2011/0167369 A1* | 7/2011 | van Os | G06F 3/0483 715/769 |
| 2012/0216143 A1* | 8/2012 | Shiplacoff et al. | 715/784 |

(Continued)

*Primary Examiner* — William Bashore
*Assistant Examiner* — Rayeez Chowdhury
(74) *Attorney, Agent, or Firm* — Min-Lee Teng; Litron Patent & Trademark Office (57) ABSTRACT

A computer-implemented method for inputting data entries of a service for use with a portable electronic device having a touch screen. By detecting a continuous stroke moving on the touch screen to select desired items among multiple levels of menus which are displayed in a sequence for an object targeting to a service, the data entries according to the selected items are committed for the object when the continuous stroke ends. In addition, multiple items can be selected in one level of menu by using a pre-defined stroke indication in the continuous stroke. Furthermore, the selected items can be corrected by re-stroking back to the corresponding levels of menus.

18 Claims, 8 Drawing Sheets

(56) References Cited

U.S. PATENT DOCUMENTS

| | | | |
|---|---|---|---|
| 2012/0252410 A1* | 10/2012 | Williams | G06F 21/36 455/411 |
| 2013/0061122 A1* | 3/2013 | Sethi | G06F 3/0482 715/217 |

* cited by examiner

METHOD OF INPUTTING DATA ENTRIES OF A SERVICE IN ONE CONTINUOUS STROKE

BACKGROUND OF THE INVENTION

1. Field of the Invention

The invention relates in general to a computer-implemented method for inputting data entries of a service and, in particular, to a method for inputting data entries of a service for use with a portable electronic device having a touch screen.

2. Description of the Prior Art

As portable electronic devices become more and more popular and widely used, a variety of services, such as personal information management (PIM), social utilities, Web search, navigation and so on, are developed for device users. Development in portable devices continues to strive towards user interfaces which are user-friendly and suitable for the variety of services, because an efficient, user-friendly interface is vital for user acceptance of any consumer product.

For a portable device, one criterion by which the user interface is evaluated is the ease with which data entries may be inputted into the services themselves. One of the conventional implementations for users to input data entries is through a complex menu. Users have to get into each of the menu items to set the corresponding data contents by different graphic user interfaces (GUIs) or even by linking into another complex menu.

For example, if users would like to create an event in a calendar service, a list of menu items is provided to users. Users have to select one of the items for inputting topic information which leads users to a text input GUI. After text input finished, users have to select another one of the items for setting a date which leads users to a calendar GUI. After the desired date is set, users need to repeat similar actions for other menu items, until all the necessary data entries for the calendar event are set well.

Another implementation is to flatten the complex menu to generate a plurality of data entry fields and display them on a plurality of screen areas with buttons, text input GUIs and menus. In a typical point-and-touch user interface, a particular data entry field is chosen to receive corresponding data entries by stroking on a screen area corresponding to the particular data entry field. Then the corresponding data entries are entered or set in the respective screen area. A similar procedure is followed to correct or update the content in a particular data entry field wherein the user strokes on the corresponding screen area and corrects or updates the data within the screen area for that particular field.

In summary, the implementations mentioned above usually require a large quantity of complex user strokes and lead to an uncomfortable user experience. Accordingly, what is needed is a method to make inputting data entries of a service more intuitive and efficient.

SUMMARY OF THE INVENTION

One object of the present invention is to provide a method for inputting data entries of a service for use with a portable electronic device having a touch screen.

One embodiment in the present invention is to detect a continuous stroke moving on the touch screen to select desired items among multiple levels of menus which are provided for an object targeting to a service. The multiple levels of menus can be displayed sequentially wherein the items of next level of menu depend on to the stroked items of current level of menu. The continuous stroke can be initiated by dragging the object targeting to the service. Once the continuous stroke ends, the data entries according to the selected items are committed for the object targeting to the service.

In one embodiment, multiple items can be selected in one level of menu by using a pre-defined stroke indication in the continuous stroke. In addition, the selected items can be corrected by re-stroking back to the corresponding levels of menus.

In one embodiment, if the multiple levels of menus which are provided for an object targeting to the service cannot be display in a single page on the touch screen, an option is provided for users to use the continuous stroke to trigger additional menus shown in another page and continue the stroke to complete inputting data entries of the service.

Other objects, technical contents, features and advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF THE INVENTION

The detailed explanation of the present invention is described as following. The described preferred embodiments are presented for purposes of illustrations and description, and they are not intended to limit the scope of the present invention.

Figure 1:
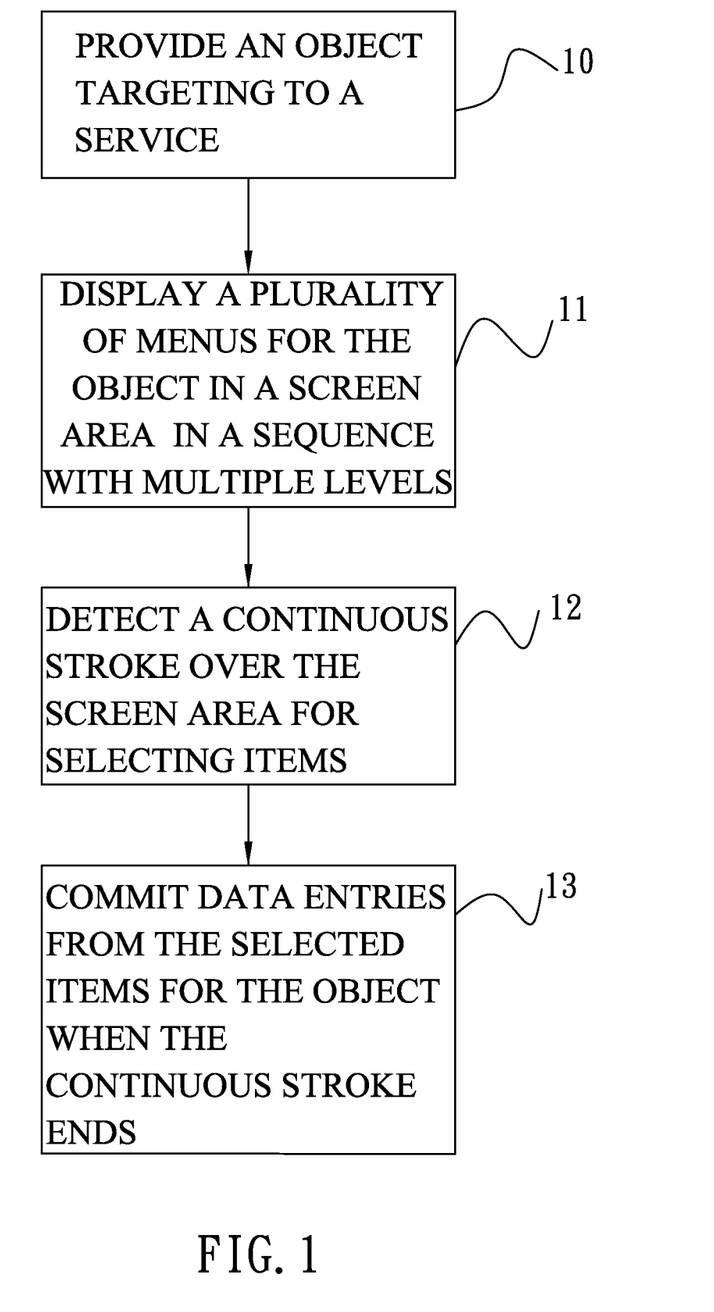
FIG. 1 is a schematic flow diagram for a method of inputting data entries of a service.

The invention illustrates a method for inputting data entries of a service for use with a portable electronic device having a touch screen. FIG. 1 shows a schematic flow diagram for the method. Initially, an object is provided targeting to a service (step 10). In one embodiment, the object can be a text content. In another embodiment, the object can be a media file, such as a music file, a still image or a video clip.

Next, as shown in step 11, in one embodiment a plurality of menus for the object is displayed in a screen area on the touch screen in a sequence with multiple levels in one shot. In another embodiment, by detecting the continuous stroke over the screen area, each menu item stroked at current level of the plurality of menus decides the display of the corresponding next level of plurality menus for data entry respectively. Therefore, the plurality of menus are shown sequentially according to a plurality of movements in a continuous stroke over the screen area. Furthermore, any selected item of each stroked menu is the last item stroked before the continuous stroke leaves the menu (step 12).

Once the continuous stroke ends, the corresponding data entries according to the selected items for the object along with the object itself are committed (step 13). Thus inputting data entries of the service is completed.

FIG. 2A to FIG. 2F depict an example to further explain the flow diagram mentioned above. Please refer to FIG. 2A. An object which is a text content 210 targeting to a calendar service is entered through a soft keyboard 220. Continuing referring to FIG. 2B, in one embodiment, the text content 210 is dragged toward to the soft keyboard 220 through a stroke with movement 240 and the soft keyboard 220 is then replaced by a service menu 230. Since the text content 210 is targeting for a calendar service, the movement 240 directs to the item 231 representing a calendar service.

Figure 2A:
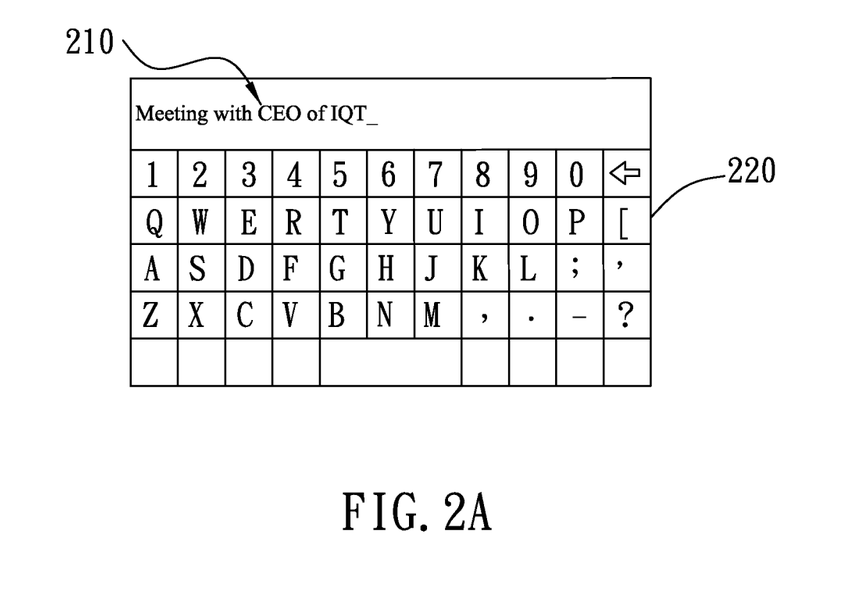
FIG. 2A to FIG. 2F depict an example to further explain the schematic flow diagram for the method of inputting data entries of a service.
Figure 2B:
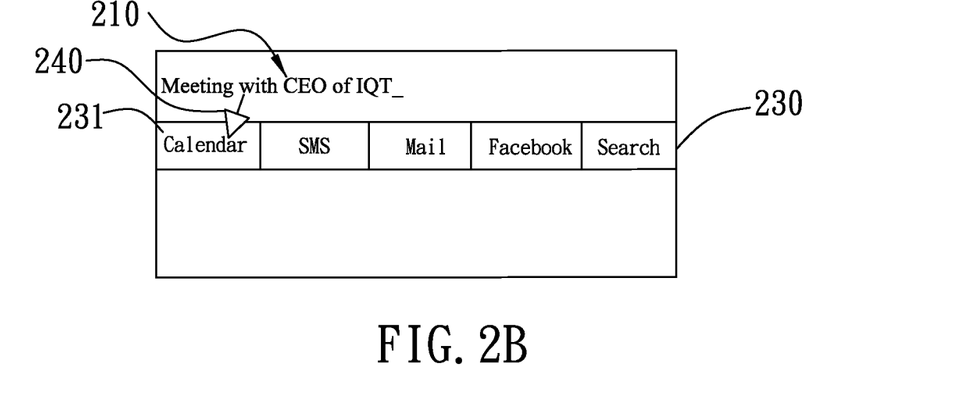

In another embodiment, service menu 230 can be shown right after finishing the inputting of the text content. Therefore the continuous stroke can start directly from the calendar item in the service menu without the movement 240.

Figure 2C:
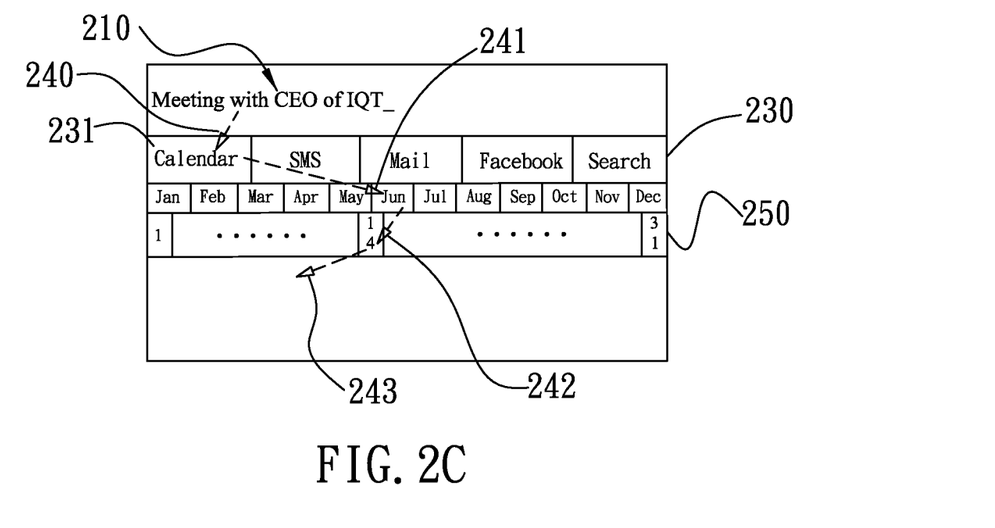
Figure 2D:
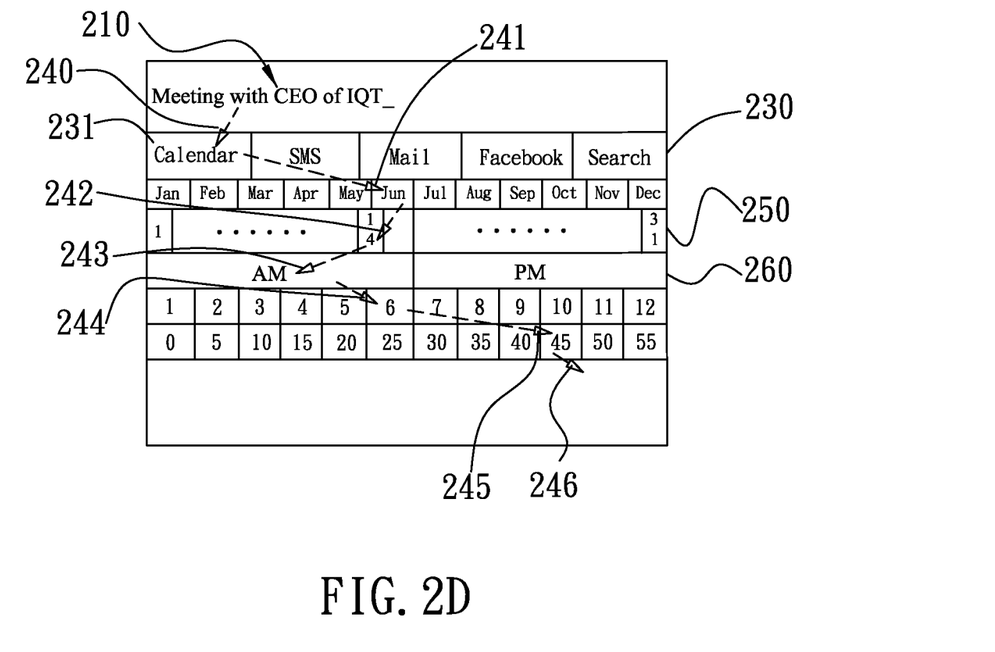

Next, as shown in FIG. 2C, a menu 250 which comprises two sub-menus for date setting of the calendar service is triggered. The stroke continues through movements 241, 242 and 243 to select a date as June 14$^{th}$. In addition, referring to FIG. 2D, a menu 260 which comprises three sub-menus for time setting of the calendar service is triggered following the menu 250. Then the stroke continues through movements 244, 245 and 246 to select a time as 6:45 am.

Figure 2E:
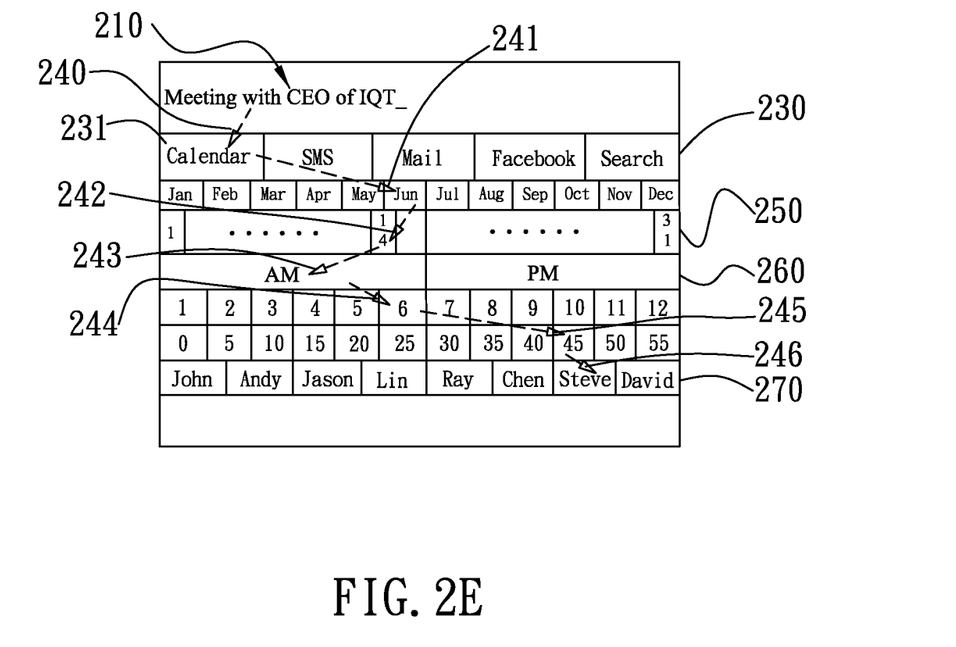

Following menu 260, a menu 270 with a name list is shown as in FIG. 2E for setting an attendee of the calendar service and the movement 246 directs to a name "Steve" in the name list. If the continuous stroke ends with movement 246, the text content, the set date, the set time and the attendee will be committed as data entries of the calendar service.

Figure 2F:
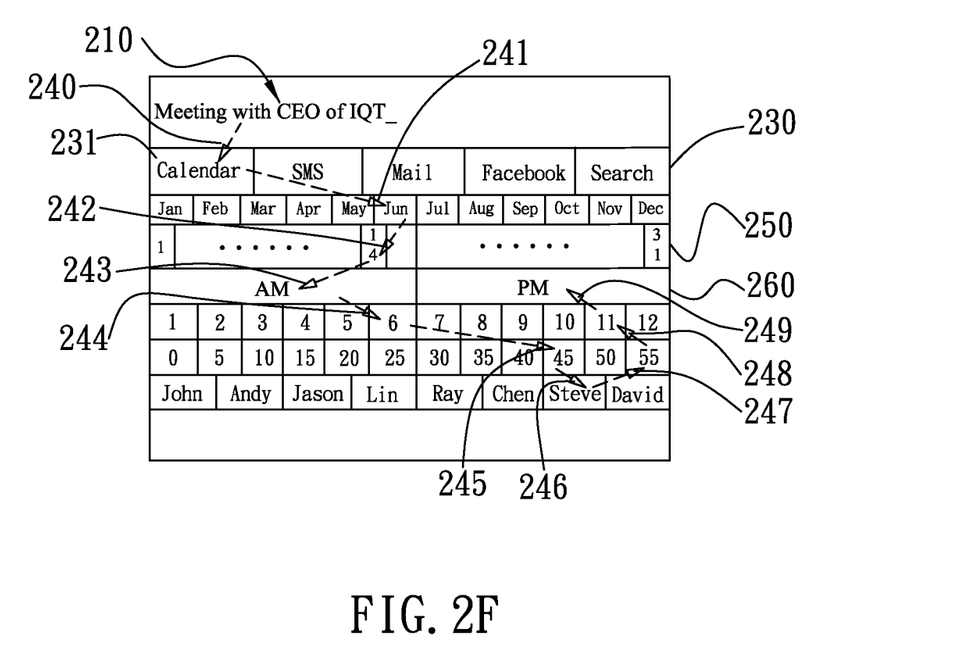

On the other hand, FIG. 2F demonstrates a way to change the selections made before ending the continuous stroke. Through the movement 247, 248 and 249 which directs back to the time setting menu, the original selection will be deselected and replaced by the updated time 11:55 pm. In other words, if the continuous stroke ends with movement 249, the text content, the set date, the updated time and the attendee will be committed as data entries of the calendar service.

Figure 3A:
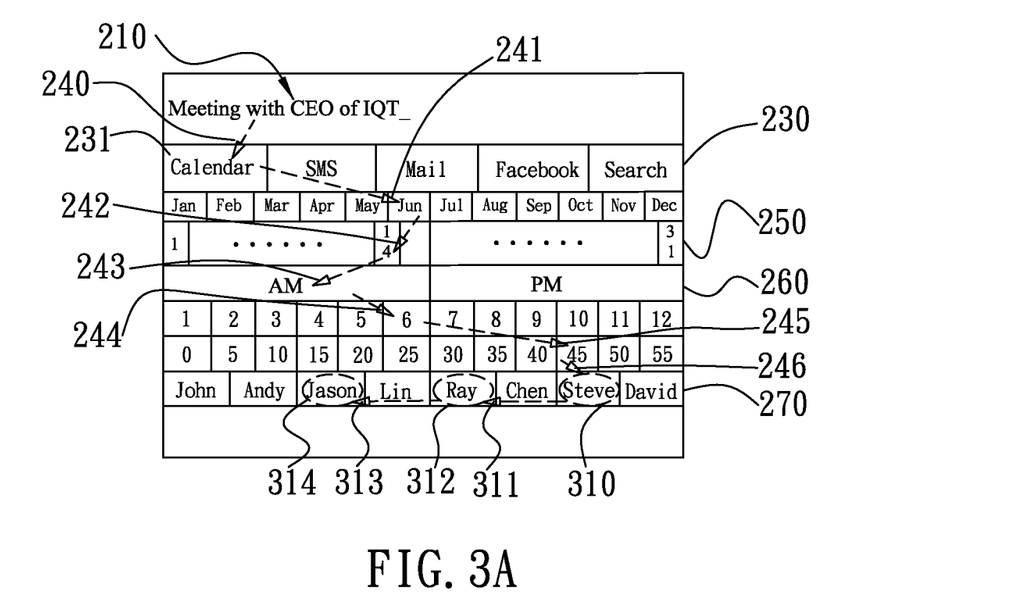
FIG. 3A and FIG. 3B show two embodiments for multiple selections in a menu when inputting data entries of a service.
Figure 3B:
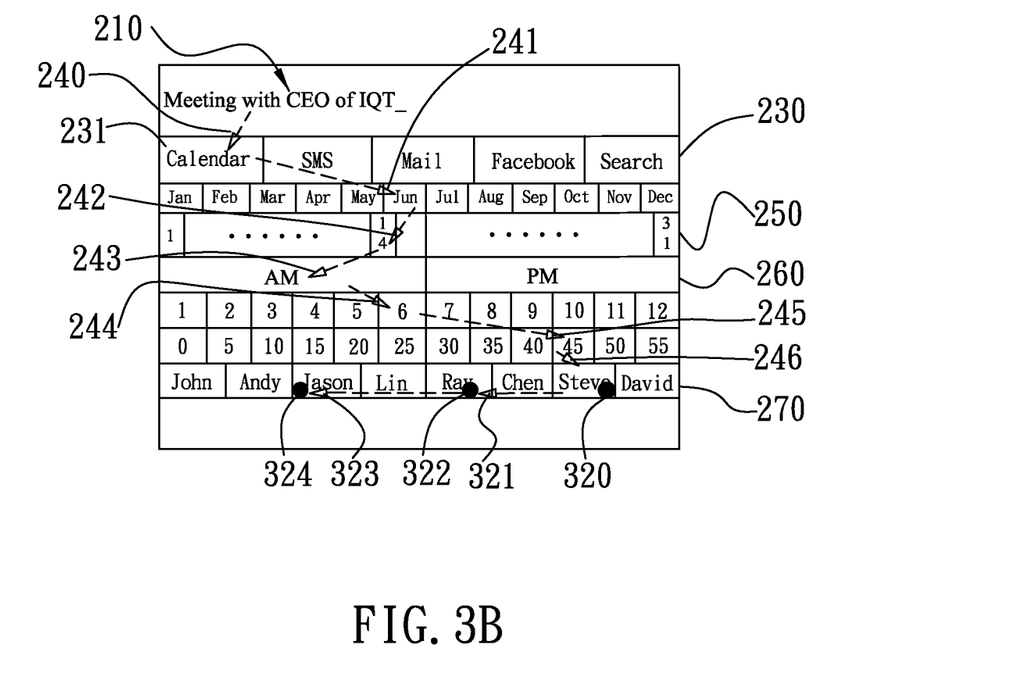

In some menus, such as the attendee setting menu, a multiple selection mechanism is necessary. To fulfill the need, a pre-defined gesture through the continuous stroke can be applied on the items to be selected multiply. FIG. 3A and FIG. 3B depicts two embodiments for this purpose.

In one embodiment as shown in FIG. 3A, if "Steve", "Ray" and "Jason" are all to be added into a attendee list, following movement 246, a pre-defined route of movement 310, such as a circle, is applied on item "Steve". Then the stroke continues with movement 311 and a circle movement 312 applied on item "Ray". Finally, the stroke continues with movement 313 and a circle movement 314 applied on item "Jason". Please note that, if "Jason" is the last item to be selected for the attendee list, the circle movement 314 is optional. This is because the item "Jason" will be selected when the continuous stroke leaves menu 270, even without the circle movement 314. Consequently, the text content, the set date, the set time and the attendee list will be committed as data entries of the calendar service, if the continuous stroke ends with movement 313 or movement 314.

In another embodiment as shown in FIG. 3B, following movement 246, a pressing 320 is applied on item "Steve". Then the stroke continues with movement 321 with a pressing 322 applied on item "Ray". Finally, the stroke continues with movement 323 with a pressing 324 applied on an item "Jason". Please note that, if "Jason" is the last item to be selected for the attendee list, the pressing 324 is optional, due to the same reason described in the previous embodiment. Consequently, the text content, the set date, the set time and the attendee list will be committed as data entries of the calendar service, if the continuous stroke ends with movement 323 or movement 324.

Figure 4A:
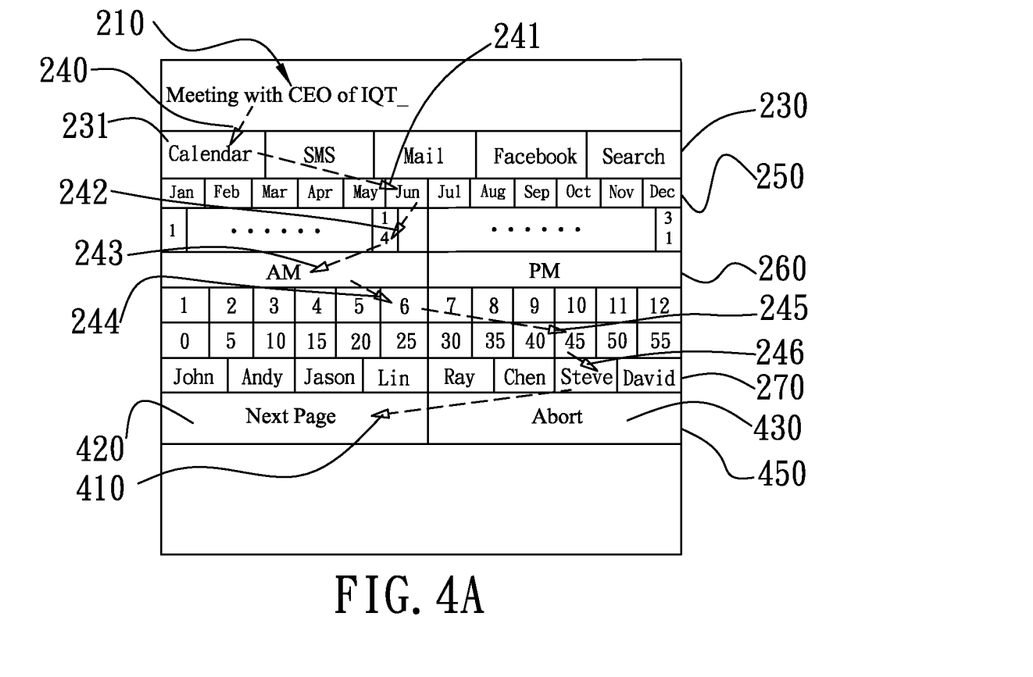
FIG. 4A and FIG. 4B illustrate one embodiment for inputting data entries of a service in multiple pages.
Figure 4B:
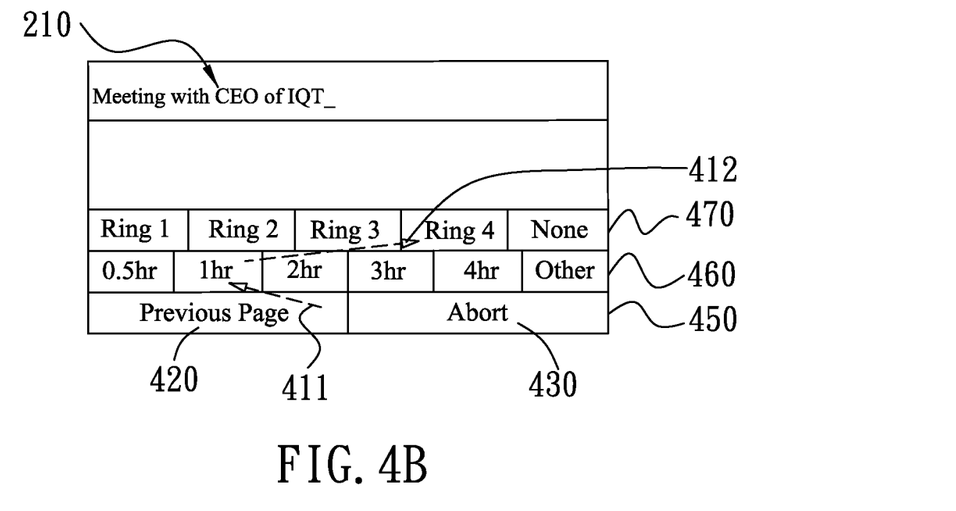

Additionally, if the plurality of menus cannot be fully displayed in the screen area, an item "Next Page" 420 indicating the availability of additional menus is provided in the last level of menu 450, as illustrated in FIG. 4A. To trigger the additional menus, the stroke continues with movement 410 to stroke on item 420, following movement 246. Thus, as depicted in FIG. 4B, two additional menus 460 and 470 for activity period setting and reminder ring-tone setting respectively are displayed above menu 450. With the bottom-up arrangement for the additional menus, the stroke can continue with movement 411 and 412 and therefore the corresponding settings are selected through the continuous stroke.

Figure 4C:
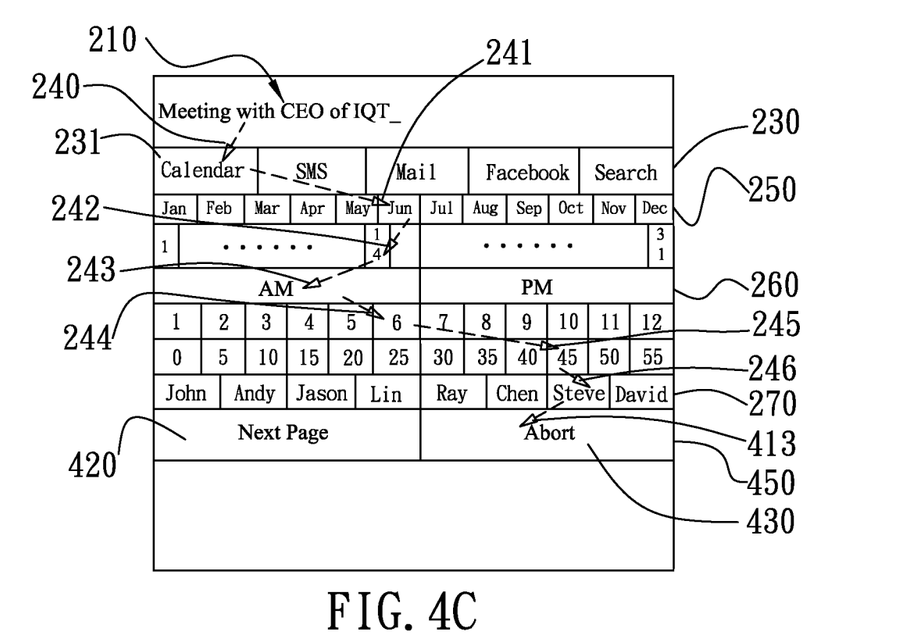
FIG. 4C shows one embodiment for aborting inputting data entries of a service.

Please refer to FIG. 4C. In one embodiment, an option for giving up the inputting of data entries is available by providing an "Abort" item 430 in the last level of menu 450. With the continuous stroke ending with movement 413 to stroke on item 430, the inputting of data entries is terminated and no selected items will be committed as data entries of the calendar service.

Figure 5A:
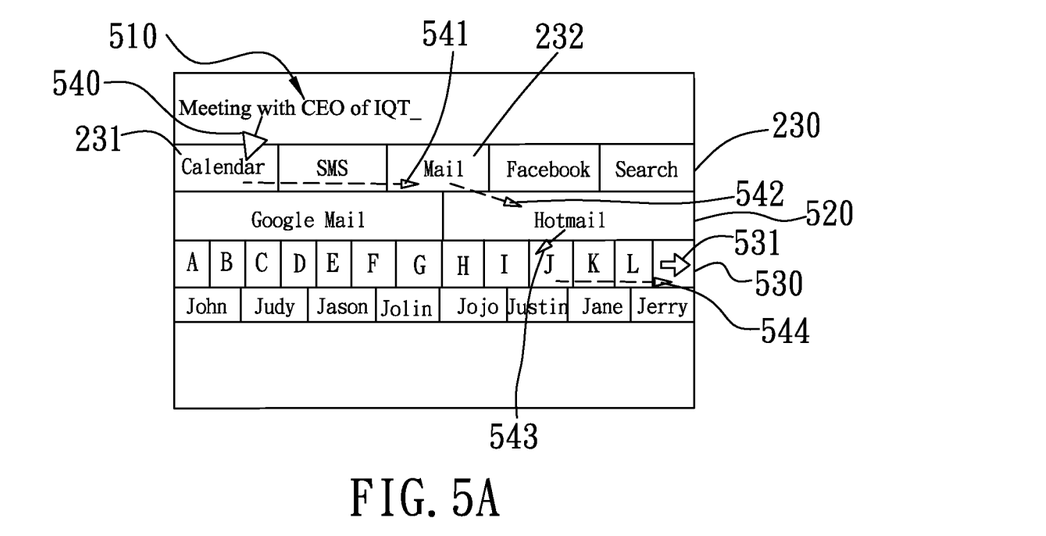
FIG. 5A and FIG. 5B depict another example for the method of inputting data entries of a service.
Figure 5B:
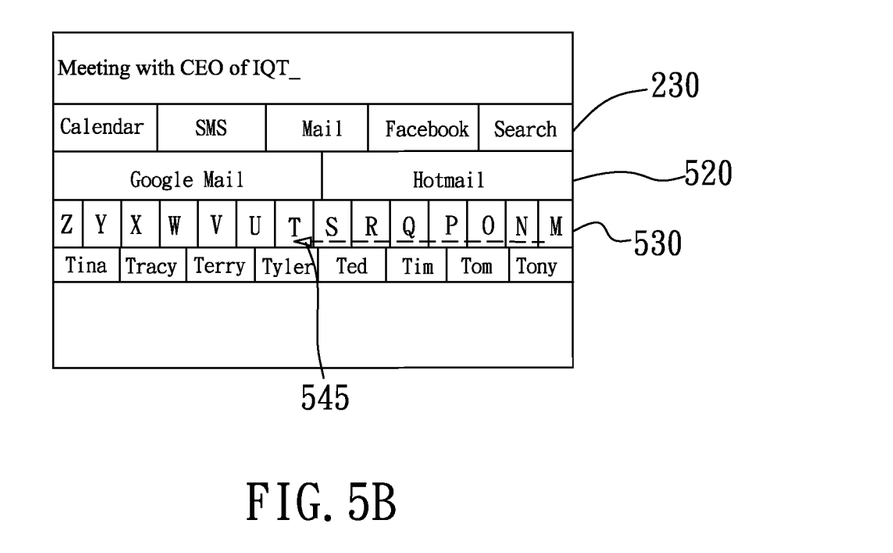

FIG. 5A and FIG. 5B demonstrate another example for the object targeting to mail service and also show another implementation for selecting names from a list.

Please refer to FIG. 5A. An object which is a text content 510 targeting to a mail service is entered through a soft keyboard (not shown). In one embodiment, the text content 510 is dragged toward to the soft keyboard through a stroke with movement 540 and the soft keyboard is then replaced by the service menu 230. Since the text content 510 is targeting for a mail service, the continuous stroke further directs to the item 232 representing a mail service through movement 541.

In another embodiment, service menu 230 can be shown right after finishing the inputting of the text content. Therefore the continuous stroke can start directly from the mail item 232 in the service menu 230 without the movement 540 and 541.

Next, a menu 520 which comprises two items for mail category setting of the mail service is triggered. The stroke continues through movements 542 to select a mail category as Hotmail. Following menu 520, a menu 530 with a name list is shown for setting a recipient of the mail service. In menu 530, items with capital letters which indicate the first letter of each of all kinds of names are provided. As shown in FIG. 5A, "J" is selected through movement 543. Thus names, such as John, Judy and Jason which start with "J", appear. If the letter after "L" is to be selected, the right arrow item 531 can be selected through movement 544 and triggers a next view illustrated in FIG. 5B. In this case, the stroke continues with movement 545 which ends at item "T" and therefore the corresponding names appear.

In this example for the object targeting to mail service, it can change the selections made before ending the continuous stroke in the same way described in the object targeting to calendar service which is illustrated in FIG. 2F. It can add multiple names in the recipient list in the same way, which is illustrated in FIG. 3A to FIG. 3B. Moreover, if the plurality of menus cannot be fully displayed in the screen area, it is capable of indicating the availability of additional menus in the same way, which is illustrated in FIG. 4A and FIG. 4B. An option for giving up the inputting of data entries is available in the same way, which is illustrated in FIG. 4C.

Other examples for the object targeting to SMS service, Facebook service and Search service are operated in the same way described above. They are not further described hereafter.

Moreover, to make the selection for menu items more user-friendly, the boundary of two adjacent menus can be indicated more clearly. For example, the boundary can be displayed by a bold line between each of two adjacent menus. Another way is to indicating the boundary by using two different colors for each of two adjacent menus.

To sum up, using a continuous stroke for inputting data entries of a service not only makes the user interface more intuitive but also improves the efficiency of inputting operations.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the claims appended hereto and their equivalents.

What is claimed is:

1. A method of inputting data entries corresponding to an object targeting to a service for use with an electronic device having a touch screen, the method comprising the steps of:
   a. providing an object targeting to a service corresponding to an event, wherein the object is an user inputted content for inputting data entries based on a continuous stroke moving on the touch screen to select a desired item distributed in multiple levels;
   b. displaying a plurality of menus in a first area on the touch screen, wherein the plurality of menus are arranged in multiple levels displayed in a sequence along a vertical direction of the touch screen, wherein a continuous stroke moving across the plurality of menus in said sequence is detected by the touch screen to select items on each menu for inputting data entries corresponding to the object targeting to the service, wherein the continuous stroke comprises a pre-defined pattern for selecting each item displayed on said touch screen and the pre-defined patterns include moving a stroke from a first level menu into a second level menu next to the first level menu in said sequence, the last item stroked in the first level menu is a selected item, wherein multiple selectable items of said first level menu that are displayed horizontally and items of said second level menu are displayed on said touch screen at a same time; and
   c. committing and associating the data entries to the object targeting to the service according to the selected items on the plurality of menus when the continuous stroke ends.

2. The method according to claim 1, wherein each stroked item at the first level menu decides items to be displayed at the second level menu.

3. The method according to claim 1, wherein the pre-defined patterns further include a circle around an item for selecting the item.

4. The method according to claim 1, wherein the pre-defined patterns further include a pressing on an item for selecting the item.

5. The method according to claim 1, wherein a selected item of a menu can be deselected if said menu is re-stroked again in the continuous stroke.

6. The method according to claim 1, wherein step a further comprises dragging the object toward a service menu for selecting a service corresponding to the event for inputting data entries.

7. The method according to claim 6, wherein the service corresponding to the event is a calendar service.

8. The method according to claim 6, wherein the object is described by a text content.

9. The method according to claim 8, wherein the text content is a description for setting up a meeting.

10. The method according to claim 8, wherein the text content is inputted by a soft keyboard in the first area, and the soft keyboard is replaced by the plurality of menus when the service corresponding to the event is selected.

11. The method according to claim 9, wherein the first level menu comprises items for setting date information for the meeting.

12. The method according to claim 11, wherein the second level menu comprises items for setting time information for the meeting.

13. The method according to claim 1, wherein when an item displayed in a second area on the touch screen is stroked, additional items are displayed to replace the currently displayed items in the first area on the touch screen, wherein the additional items are arranged next to the second area so as to maintain the continuous stroke for continuously selecting items on the additional items.

14. The method according to claim 1, wherein when an item displayed in a second area on the touch screen is stroked before the continuous stroke ends, said inputting data entries is aborted.

15. The method according to claim 1, wherein a boundary is indicated between two adjacent menus.

16. The method according to claim 15, wherein the boundary is indicated by a bold line between the two adjacent menus.

17. The method according to claim 15, wherein the boundary is indicated by using two different colors for the two adjacent menus.

18. The method according to claim 1, wherein said multiple selectable items of said first level menu are displayed horizontally and vertically, wherein said multiple selectable items of said first level menu and items of said second level menu are displayed on said touch screen at said same time.

* * * * *